United States Patent
Wauters et al.

(10) Patent No.: US 6,920,569 B1
(45) Date of Patent: Jul. 19, 2005

(54) DEVICE CONFIGURED AS STAND-ALONE OR SLAVE BASED ON DETECTION OF POWER SUPPLY IN A POWERED DATA BUS SYSTEM

(75) Inventors: Piet S. Wauters, Leuven (BE); Jean L.L.J. Lenaerts, Leuven (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/720,149

(22) PCT Filed: Apr. 25, 2000

(86) PCT No.: PCT/EP00/03796

§ 371 (c)(1),
(2), (4) Date: Dec. 21, 2000

(87) PCT Pub. No.: WO00/67137

PCT Pub. Date: Nov. 9, 2000

(30) Foreign Application Priority Data

Apr. 29, 1999 (EP) ............................................. 99201337
Jul. 26, 1999 (EP) ............................................. 99202447

(51) Int. Cl.[7] ................................................ G06F 1/26
(52) U.S. Cl. ........................ 713/300; 713/320; 713/340
(58) Field of Search ................................ 713/300, 320, 713/340, 3

(56) References Cited

U.S. PATENT DOCUMENTS 5,799,196 A * 8/1998 Flannery ...................... 713/320
6,012,103 A * 1/2000 Sartore et al. .................. 710/8
6,101,076 A * 8/2000 Tsai et al. ...................... 361/90
6,105,097 A * 8/2000 Larky et al. ................. 710/314
6,128,743 A * 10/2000 Rothenbaum ................ 713/300
6,363,491 B1 * 3/2002 Endo .......................... 713/310

FOREIGN PATENT DOCUMENTS

WO        WO9908422        2/1999

OTHER PUBLICATIONS

2findit. 'Re: USB Problems'.In ISPnews [online]. alt. sys.pc− clone.dell newsgroup, Jan. 7, 1999; 21:38:52 EDT. Retrieved from the Internet: <URL: http://groups.google.com>, message ID<0del2.1054$MI3.1661@news15.ispnews.com>#1/1.□□.*

Phillps Semiconductors, "Universal Serial Bus Standard", May 1996, p. 7.*

* cited by examiner

*Primary Examiner*—Lynne H. Browne
*Assistant Examiner*—Tse Chen

(57) ABSTRACT

A device is provided for use in a data bus system like a USB bus system. The device can be coupled to a host via a bus cable that comprises a data transfer conductor and power supply conductors. The device detects whether a power supply is connected to the power supply conductors. Dependent on whether or not connection of the power supply has been detected, the device starts operating in a slave mode or in a stand-alone mode respectively. In a slave mode the device waits for commands received via the data transfer conductor. In the stand-alone mode the device operates independently from communication via the cable. Preferably, the device signals back to the host whether it is in the slave mode by enabling pull-up of a potential of the data transfer conductor. In an embodiment, detection and signaling is controlled via single control node.

3 Claims, 1 Drawing Sheet

DEVICE CONFIGURED AS STAND-ALONE OR SLAVE BASED ON DETECTION OF POWER SUPPLY IN A POWERED DATA BUS SYSTEM

The invention relates to device for use in data bus system such as a USB bus system.

The USB system is known from PCT patent application WO99/08422 (assigned to the same applicant as the present application; applicant's ref. No. PHN 16496). A USB bus system comprises a host station connected to a device via a USB cable. The connection may be indirect, via hub station connected to the USB cable, or direct, with the host station itself connected to the USB cable.

The USB cable contains a first and a second power supply conductor and a first and a second data transfer conductors. The power supply conductors serve to supply power from the host station to the device (or from any intermediary station if the device is connected indirectly). USB devices such as a mouse or a keyboard power their operation with the power received from the USB cable. Other devices may have their own power supply and don't use the power from the USB cable.

The data transfer conductors serve for communication of data between the host and the device. The data includes commands send from the host to the device to control the device and data such as mouse position updates or keystrokes. The USB bus system is hierarchical in the sense that all message communication via the data transfer conductors is controlled by the host and the device operates as a slave, which waits for instructions received from the host.

The data transfer conductors also serve to signal attachment of the device to the USB cable. Any device may be attached to the USB cable at any time, also after the host station has started up. The bus system pulls the potential of the data transfer conductors toward that of the first power supply conductor. The device contains a resistor connected between one of the data transfer conductors and the second power supply conductor, so that the potential of the data transfer conductor is pulled toward that of the second power supply conductor when the device is attached to the USB cable. The host station monitors the potential of the data transfer conductor (directly or by means of a hub station). If the potential of the data transfer conductor shifts towards that of the second power supply conductor, a "connect condition" is said to occur, signaling to the host station that a device has been attached. Once the host station detects the "connect condition", the host station starts communicating with the device, in order to set-up the device and to set the device into action.

The device according to WO99/08422 has a switch in series with the second resistor. When the device is switched on the switch is initially non-conductive and it is made conductive only after the device has had time to initialize itself. Thus the device creates a delay between attachment and the occurrence of the "connect condition". The delay gives the device the opportunity to initialize itself before the host can communicate with the device to set it in action. When there is no host station, or the when the host station is switched-off, the device does not get into action.

Earlier filed patent application No. EP 99201337.5 (unpublished at the time of filing the present application; assigned to the same application as the present patent application), which is incorporated herein by way of reference, describes how a device can be used either as a hub connecting the host station to the subsystem or as a host of the subsystem. However, this earlier filed patent application does not describe the use of the power supply to detect the absence on presence of an active host station.

It is an object of the invention to provide a way to make it possible to use the device also when it is not connected to an active host station via the cable.

The device according to the invention is described in claim 1. Preferably, the device is for use in a USB bus system. According to the invention, the device uses the presence or absence of power supply on the bus cable to decide whether to start operating in a stand-alone mode or to wait for data transfer from the host station to operate as a slave. If no power is supplied via the bus cable, the device operates in the stand-alone mode.

By "stand-alone" it is meant that the device does not operate in the bus system as "slave" of the host station. In the stand-alone mode the device operates independent from any messages from the data transfer conductors. The device starts actions that the device would not take, or would only take upon command by the host station, if the host station had been detected. "Stand-alone" does not exclude the possibility that the device itself acts as host station for a bus-subsystem connected to the device. Claim 2 describes an embodiment of the device according to the invention. In this embodiment, the device disables the creation of a "connect condition" (pulling the potential of the data transfer conductor back to the potential of one of the power supply conductors) when in the stand-alone mode. This prevents that a host station will unexpectedly try to start communication with the device when the device is attached to the bus system during operation in the stand-alone mode. In the slave mode, creation of the "connect condition" is normally enabled.

Claim 3 describes an embodiment of the device according to the invention that uses a single connection of the control circuit both to sense whether a host station is present and to control the generation of the "connect condition". The data transfer conductor is connected via a resistive element to a potential source to pull the potential of the data transfer conductor so as to create the connect condition. Preferably, the potential source is derived from the power supply conductors.

Another embodiment of the device according to the invention is described in claim 5. This embodiment allows the device to continue testing whether the device is attached to an active bus system, also after the device has initially entered the stand-alone mode or the slave mode. Thus, the device can switch from the stand-alone mode to the slave mode or vice versa, dependent on whether or not a power supply is detected on the power supply lines during operation in the stand-alone mode or the slave mode. The device may provide for switching from the stand-alone mode to the slave mode, or for switching from the slave mode to the stand-alone mode or both.

When switching from the slave mode to the stand-alone mode or vice versa, a resistive connection between the data transfer conductor and the first one of the power supply conductors is preferably switched off and on respectively, to simulate disconnect and connect of the device. In a further embodiment, the device uses single connection to its control circuit both to monitor the power supply and to control signaling of the connect condition.

These and other advantageous aspects of the device according to the invention will be described in more detail using the following figures.

Figure 1:
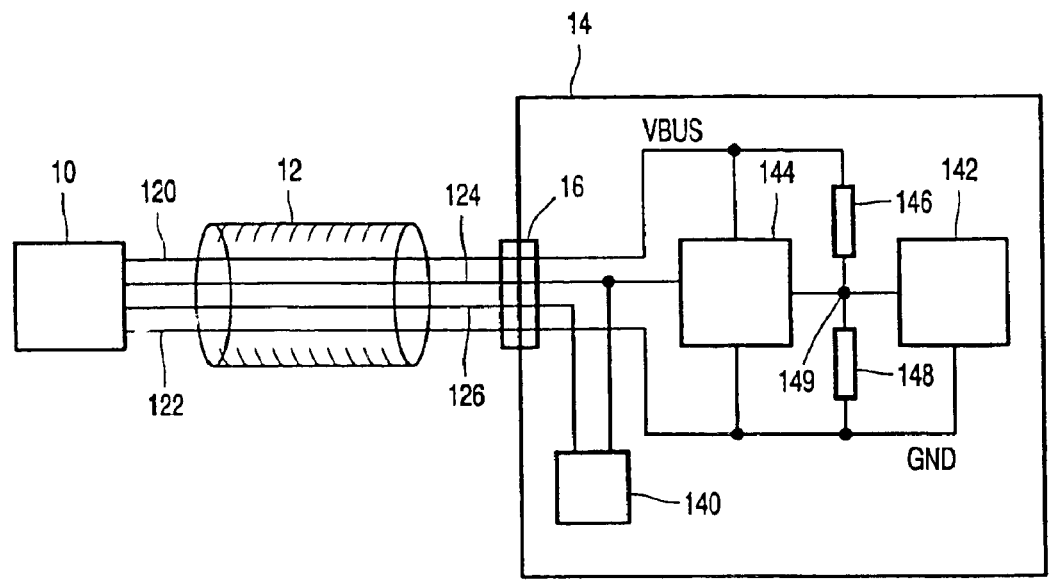
FIG. 1 shows a bus system.

FIG. 1 shows a bus system. The bus system comprises a host station part 10 and a device 14 connected via a cable 12.

The host station part may be for example a USB host station, or part of a USB system containing a host station connected to one or more hubs, the cable 12 being coupled to a port of a hub. The cable 12 comprises power supply conductors 120, 122 and data transfer conductors 124, 126. The device 14 has a connector 16 connecting the device 14 to the cable 12. The device 14 contains a data reception circuit 140 coupled to the data transfer conductors 124, 126 for receiving and transmitting messages via the data transfer conductors 124, 126.

The device 14 also contains a control circuit 142 (implemented for example as a suitably programmed microcontroller), a connect circuit 144 and resistors 146, 148. The control circuit 142 has an input/output connection coupled to a control input of the connect circuit 144 via a node 149. The node 149 is coupled to the power supply connection 120, 122 of the cable 12 via resistors 146, 148 respectively. The device 14 is powered by its own power supply (not shown).

In operation, the host station part 10 initially supplies a power supply voltage (e.g. 5V) across power supply conductors 120, 122. This power supply voltage may be used to power simple devices 14 that have no own power supply, such as a mouse or keyboard attached to the system. The data transfer conductors 124, 126 are connected to the low voltage power supply conductor 122 via respective resistances (not shown). Thus, absent any other connections to the data transfer conductors 124, 126, the potential of these data transfer conductors 124, 126 would equal that of power supply conductor 122.

This is an initial situation, which occurs before the device 14 is switched on before the device has been attached to the host station part 10 via the cable 12. According to the USB specification, the device 14 contains a resistor (not shown in FIG. 1) connected to one of the data transfer conductors 124, 126 to pull up the potential of that data transfer conductor 124, 126 towards the potential of the high power supply conductor 120. Because the potential of these data transfer conductors 124, 126 is pulled resistively, it is still possible to impose data transfer signals on these conductors, by using a strong enough driver circuit. The pull-up enables the host station part 10 to detect that the device 14 has been connected to the bus system. In response, the host station part 12 will start communicating with the device via the data transfer conductors 124, 126, in order to configure the device 14. Afterwards, the host station will write or read data to and from the device and send control signals as appropriate for using the device.

Typical examples of USB devices are a mouse, a keyboard, a computer display a camera etc. If the device 14 is not attached to the host station part 10, or when the host station part 10 is not switched-on a USB device would conventionally remain inactive, waiting until the host station part 10 is attached or switched on and starts sending messages over the data transfer conductors.

The device 14 according to the invention detects whether an active host station part 10 is attached to the connector 16 and switches to a stand-alone operating mode if this is not the case. The device 14 tests the power supply voltage supplied via the power supply conductors 120, 122 to detect whether an active host station part 110 is attached. If this power supply voltage is zero or less than a predetermined threshold, the device 14 start operating in a stand-alone mode. For example, the device may be able to operate using local information or information obtained via the internet, the device being connected to the internet via the host station part 10. When no active host station part 10 is attached, the device 14 starts operating "stand-alone" using local information. Otherwise, the device operates as a slave, receiving information (e.g. access keys) from the internet via the host station part. Of course many other applications of stand-alone vs. slave operation are possible, such consumer audio and video equipment (video recorder, CD player, TV, audio set etc.) that is either controlled by a host as part of a system or operates stand-alone.

To select between stand-alone operation and slave operation, the control circuit 142 has a connection coupled to the power supply conductors 120, 122. The control circuit 142 switches this connection as an input, to sense whether an active host station part 16 is connected to the device 14. If an active station part 10 is connected, the resistors 146, 148 form a voltage divider. (Resistor 146 being smaller than resistor 148, so that the potential of the node 149 is closer to that of the high power supply conductor 120 than to that of the low power supply conductor 122). this results in a high voltage at the node 149, which is detected by the control circuit 142, which consequently starts sets the device to operate as a slave. If the device is disconnected from the cable 12, the connection for the high power supply conductor floats and the potential of the node 149 is pulled to the potential of the low power supply connected to the control circuit 142. As a result, the control circuit set the device 14 to operate in the stand-alone mode. Similarly, if no power supply voltage is present across the power supply conductors 120, 122 the voltage at the node 149 will be low and the device will operate in the stand-alone mode.

Preferably, this test for the presence of an active host station part 10 is repeated periodically, so that the device 14 can switch between the stand-alone mode and the slave mode, dependent on the appearance or disappearance of the power supply voltage.

When the device 14 operates in the slave mode, this mode should be made detectable for the host station part 10, by connecting a pull-up circuit to one of the data transfer conductors 124, 146. Preferably, this pull-up circuit is disabled when the device 14 is not prepared to operate in the slave mode, for example, when the device 14 is initializing itself, when it operates in the stand-alone mode, or when the control circuit has not yet decided whether to operate in the stand-alone mode or in the slave mode.

For this purpose a connect circuit 144 is provided. Under control of the control circuit 142, the connect circuit 144 either pulls up the potential of one of the data conductors 124, 126 or passively or actively allows this potential to be pulled down. As shown in FIG. 1, a single node 149 connected to the control circuit 142 is used to control the connect circuit. This a preferred embodiment, because it economizes the use of output pins of the control circuit 142. However, one may of course use separate inputs and outputs (not shown) of the control circuit 142, to sense the voltage on the power supply connections 120, 122 and to control the connect circuit 144 respectively.

For use with a single node 149, the connect circuit 144 is arranged to disable the pull-up of the data transfer conductor 124, 126 when the potential of the node 149 is high due to the presence of a sufficient power supply voltage on the power supply conductors 120, 122. When the device 14 is prepared to operate in the slave mode, the control circuit 142 switches it connection to the node to be an output pin that drives a low voltage to the node 149. When the voltage of the node is low, the connect circuit 144 enables pull up of the data transfer conductor 124, 126. Preferably, the connect circuit is designed to provide a delayed response to rising of the potential of the node 149. Thus, the pull-up will remain active for a short time interval (of say 1 msec).

if the control circuit 142 temporarily switches its connection to the node to (high impedance) input, in order to sense whether a power supply voltage is still present on the power supply conductors. This enables the periodic tests of the power supply, without disconnecting the device 14 form the system.

Figure 2:
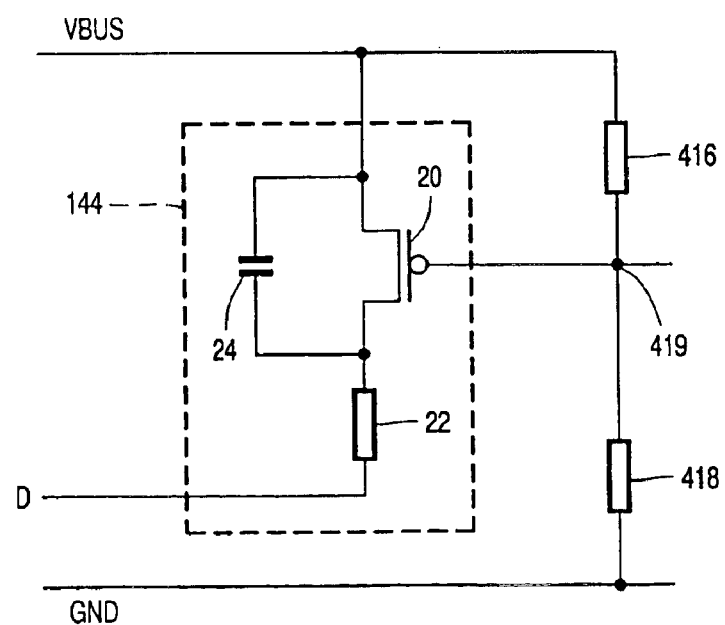
FIG. 2 shows an embodiment of a connect circuit.

FIG. 2 shows an embodiment of the connect circuit 144. The connect circuit 144 comprises a PMOS transistor 20, a resistor 22 and a capacitor 24. A main current channel of the PMOS transistor 20 is switched in series with the resistor 22 between a connection D for one of the data transfer conductor 124, 126 (not shown) and a connection VBUS for the high power supply conductor 120 (not shown). The capacitor 24 is switched in parallel with the main current channel of the PMOS transistor 20. Also shown in FIG. 2 are the resistors 146, 148, the node 149 and a connection GND for the lower power supply conductor 122 (not shown) from FIG. 1.

In operation the resistor 22 serves to pull up the potential of the data transfer conductor 124, 126 when PMOS transistor 20 is conductive. The voltage of the node 149 controls whether the PMOS transistor 20 is conductive. Resistors 146 and 149 are chosen so that the gate source voltage of PMOS transistor 20 will be below its threshold voltage when the connection of the control circuit 142 to the node 149 is switched as input. In this case, the data transfer conductor 124, 126 will not be pulled up by resistor 20, so that the host station part 10 will observe the cable as not connected.

When the control circuit 142 switches its connection to the node to output and pulls the voltage of the node 149 down, PMOS transistor 20 will become conductive. As a result resistor 22 will pull up the potential of the data transfer conductor 124, 126, indicating to the host station part 10 that the device is connected (and prepared to act as slave).

When the control circuit 142 briefly switches its connection to node 149 back to input, in order to sense whether power is still supplied via the power supply conductors 120, 122 of the cable, capacitor 24 will temporarily allow resistor 20 to continue to pull up the potential of the data transfer conductor. The capacitance of the capacitor 24 has been selected so that it will not discharge significantly during the time needed by the control circuit 142 to test the potential of the node 149. Thus, the control circuit can test the power supply while in the slave state without interrupting the connection to the system.

Of course, the connect circuit is only one possible embodiment to perform this function. For example, one might connect a resistor between VBUS and D and use an NMOS transistor to pull down the potential of D to signal that the device is not connected. In this case a buffer circuit (e.g., a resetable delay circuit) may be included between the node 149 and the gate of the NMOS transistor to keep the NMOS transistor non-conductive when the potential of the node 149 temporarily becomes high during testing for the presence of the power supply. A similar buffer may be used in between node 149 and the gate of PMOS transistor 20 instead of capacitor 24 to keep that transistor 20 temporarily conductive during sensing of the node 149. Also the resistor 22 may be connected to the own power supply of the device 14 (via PMOS transistor 20 in case of FIG. 2) instead of to the power supply VBUS received from the cable 12. However, connection to the power supply from the cable is preferred in the case of FIG. 2, because this makes it easier to ensure that PMOS transistor 20 operates properly.

What is claimed is:

1. A device for use in a data bus system, wherein the bus system comprises a host station, a bus cable and the device coupled to the host station via the bus cable, the bus cable comprising a data transfer conductor and power supply conductors for enabling the device to obtain operating power from the bus system via the bus cable, the device comprising
    a connector for coupling the device to the bus cable, and
    a control circuit coupled to the connector,
    wherein
    the control circuit is arranged
        to detect whether a power supply is connected to the power supply conductors and
        to start waiting in a slave mode for commands received via the data transfer conductor or
        to start operating in a stand-alone mode,
            dependent on whether or not connection of the power supply has been detected respectively, and,
    wherein the bus system further comprises a pull circuit for pulling a potential of the data transfer conductor away from a potential of a first one of the power supply conductors, the bus system being arranged to detect whether or not the potential of the data transfer conductor is pulled back to the potential of the first one of the power supply conductors via the bus cable so as to determine whether the device is connected to the bus cable, the device comprising
    a first resistive element and a switching element, connected in series between the data transfer conductor and
    a pull back potential source,
    the device comprising
        a node coupled to a control electrode of the switching element,
        a second and third resistive element coupled between the node and the first one and
        a second one of the power supply conductors respectively,
    so that the switching element is non-conductive when a potential of the node is affected only by the power supplied via the power supply conductors via the second and third resistive element,
    the control circuit having an I/O connection coupled to the node,
    the control circuit switching the I/O connection as an input to detect whether power is supplied via the power supply conductors and
    the control switching the I/O connection as an output to make the switching element conductive to enable pull back.

2. A device according to claim 1, wherein the pull back potential source is the first one of the power supply conductors.

3. A device for use in a data bus system, wherein the bus system comprises a host station, a bus cable and the device coupled to the host station via the bus cable, the bus cable comprising a data transfer conductor and power supply conductors for enabling the device to obtain operating power from the bus system via the bus cable, and the bus system comprises a pull circuit for pulling a potential of the data transfer conductor away from a potential of a first one of the power supply conductors, the bus system being arranged to detect whether or not the potential of the data transfer conductor is pulled back to the potential of the first one of the power supply conductors via the bus cable so as to determine whether the device is connected to the bus cable, the device comprising:
    a connector for coupling the device to the bus cable,
    a control circuit coupled to the connector, and a pull back circuit for pulling back the potential of the data transfer conductor to the potential of the first one of the power supply conductors;

wherein the control circuit is arranged:
  to detect whether a power supply is connected to the power supply conductors;
to start waiting in a slave mode for command received via the data transfer conductor or
  to start operating in a stand-alone mode,
    dependent on whether or not connection of the power supply has been detected respectively;
  to detect repeatedly whether power is supplied via the power supply conductors when the device operates in the slave mode or the stand-alone mode; and
  to switch from the slave mode to the stand-alone mode and/or vice versa by enabling and/or disabling the pull back circuit when absence or presence of power supply is detected respectively, and the pull back circuit comprises
  a first resistive element and
  a switching element, connected in series between the data transfer conductor and a pull back potential source,
  a delay element for holding a voltage across the switching element for a limited time interval after the switching element is signaled to switch from conductive to non-conductive, the device comprising
  a node coupled to a control electrode of the switching element,
  a second and third resistive element coupled between the node and the first one and a second one of the power supply conductors respectively;

so that the switching element is non-conductive when power is supplied via the power supply conductors and a potential of the node is affected only via the second and third resistive element, the control circuit having an I/O connection coupled to the node, the control circuit switching the I/O connection as an input to detect whether power is supplied via the power supply conductors and the control switching the I/O connection as an output to make the switching element conductive when the device waits in the slave mode.

* * * * *